Figure 1:
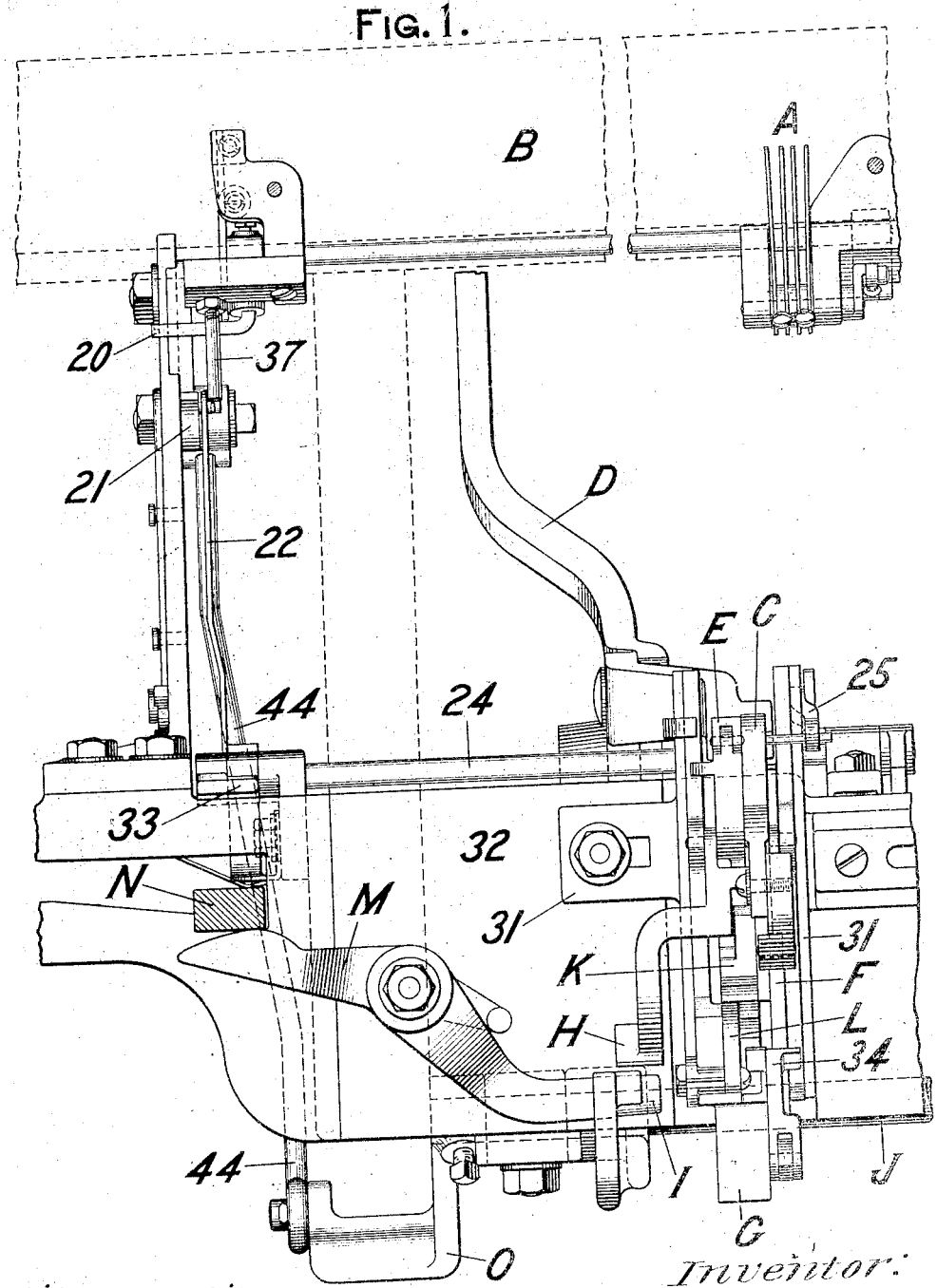

P. DAY.
PICK MATCHER FOR AUTOMATIC WEFT REPLENISHING LOOMS.
APPLICATION FILED JULY 27, 1908.

964,497.

Patented July 19, 1910.
6 SHEETS—SHEET 1.

P. DAY.
PICK MATCHER FOR AUTOMATIC WEFT REPLENISHING LOOMS.
APPLICATION FILED JULY 27, 1908.

964,497.

Patented July 19, 1910.
6 SHEETS—SHEET 2.

Witnesses:
Frank A. Peters
Jas. S. Latimer

Inventor:
Paul Day
by his Attorney Arthur F. Browne

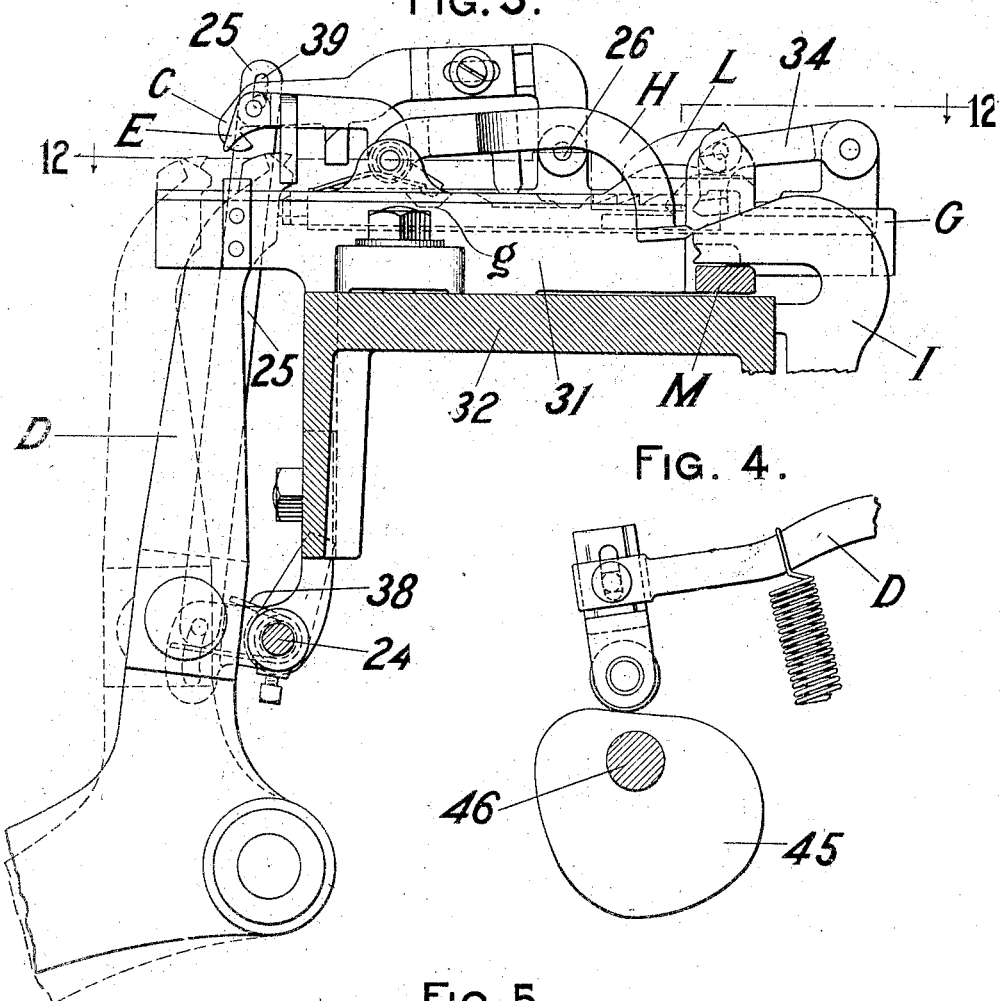

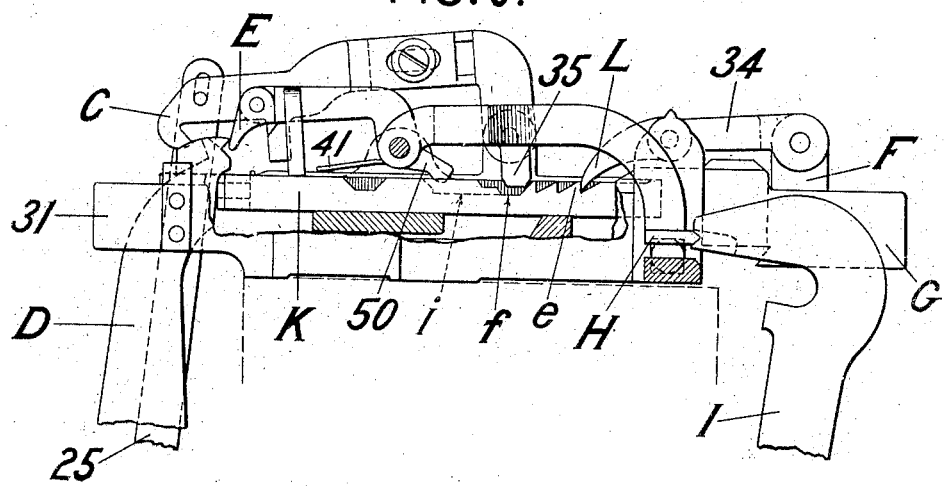
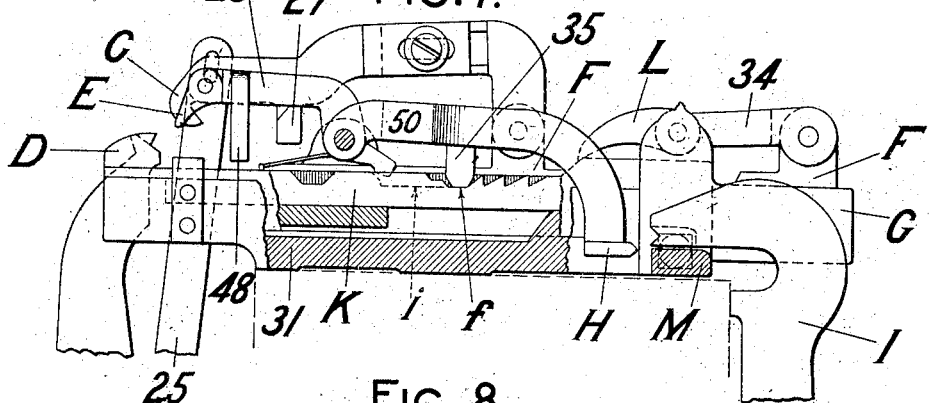
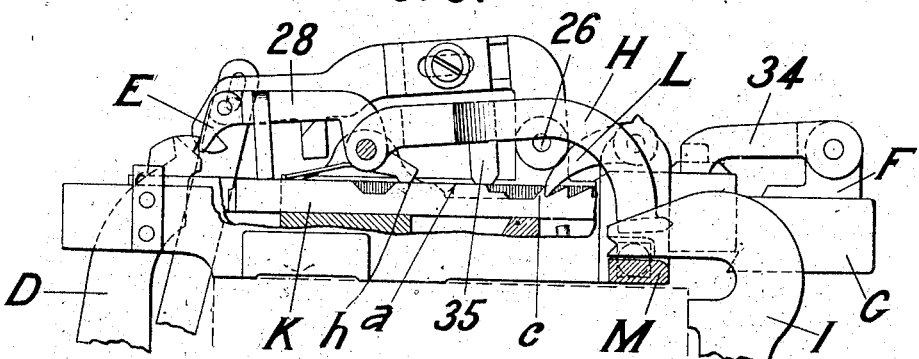

P. DAY.
PICK MATCHER FOR AUTOMATIC WEFT REPLENISHING LOOMS.
APPLICATION FILED JULY 27, 1908.
964,497.
Patented July 19, 1910.
6 SHEETS—SHEET 5.
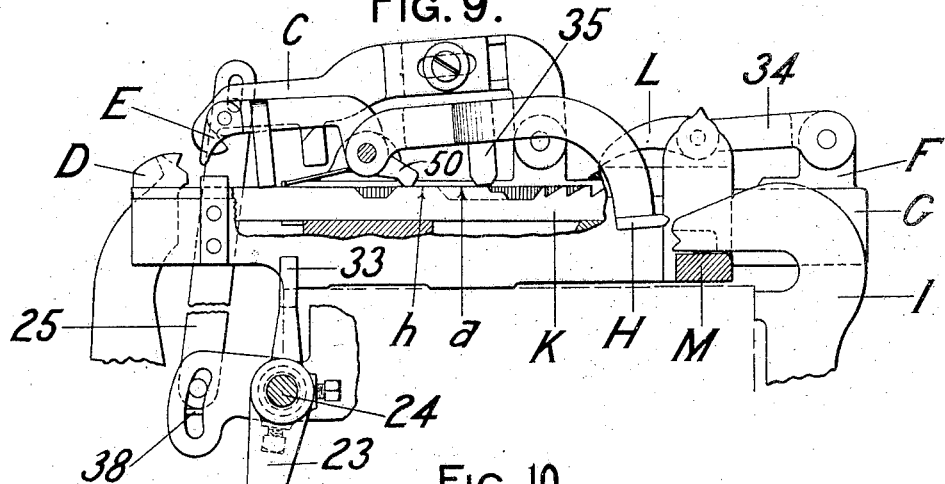
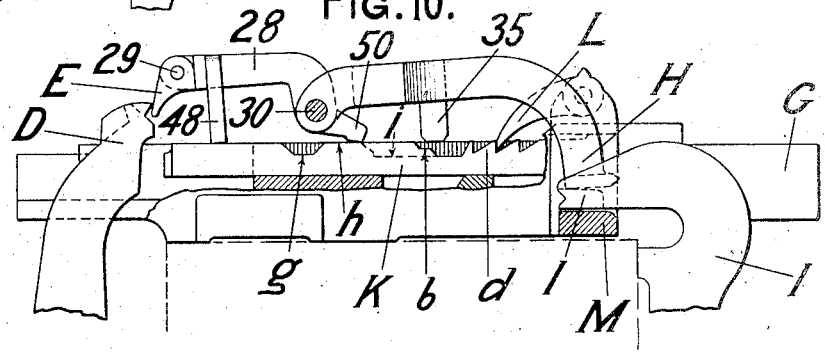
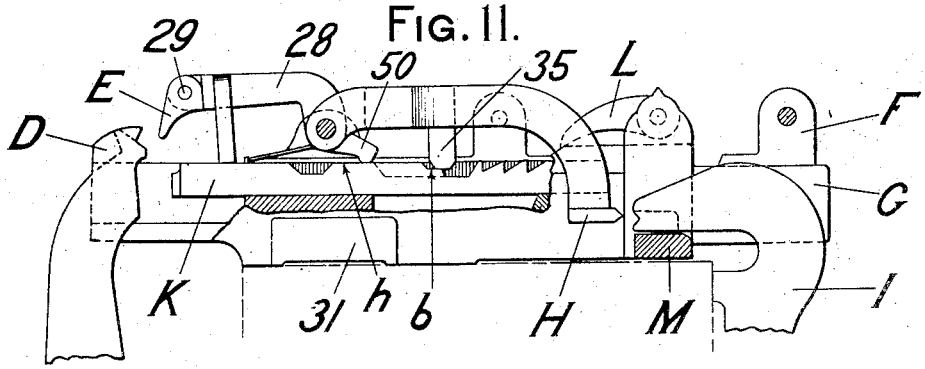
Witnesses.
Frank A. Peters.
Jos. S. Latimer
Inventor.
Paul Day
by his Attorney Arthur M. Browne

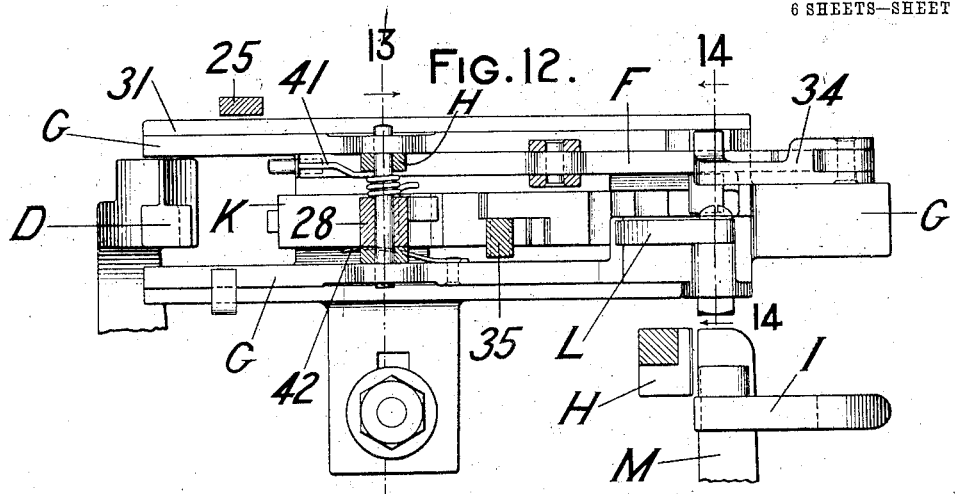

UNITED STATES PATENT OFFICE.

PAUL DAY, OF HOPEDALE, MASSACHUSETTS, ASSIGNOR TO DRAPER COMPANY, OF HOPEDALE, MASSACHUSETTS, A CORPORATION OF MAINE.

PICK-MATCHER FOR AUTOMATIC WEFT-REPLENISHING LOOMS.

964,497.   Specification of Letters Patent.   Patented July 19, 1910.

Application filed July 27, 1908. Serial No. 445,600.

*To all whom it may concern:*

Be it known that I, PAUL DAY, residing at Hopedale, in the county of Worcester and State of Massachusetts, have invented a new and Improved Pick-Matcher for Automatic Weft-Replenishing Looms, of which the following is a specification.

With automatic weft-replenishing looms, such as that set forth in United States Letters Patent of James H. Northrop, No. 529,940, November 27, 1894, wherein the weft is automatically replenished when the running weft thread breaks or is exhausted, it is desirable in weaving some classes of fabrics that the pick should be matched; that is to say, the first strand of the fresh weft should be laid in the same shed as that which was formed when the running weft failed. Various mechanisms have already been devised for thus matching the pick in automatic weft-replenishing looms, but they involve the employment of two independent weft-forks at opposite sides of the loom in order to effect the desired result.

In accordance with the present improvement a single detector or weft-fork is employed, and while the result may occasionally be to leave a partial pick in a shed, yet this partial pick in all cases where it occurs will extend more than half the width of the cloth, which is a sufficiently close approximation to exact matching of the pick in the weaving of some classes of fabrics.

In accordance with the present improvements, the single weft detector is a center weft fork acting among and at the middle of the warp threads. This center fork coöperates with a single double-acting weft-hammer and with suitable differential delaying mechanism so that the shuttle will always be at the supply side of the loom when the replenishment occurs irrespective of the direction in which the shuttle was traveling at the time the failure of weft occurred. This differential delaying mechanism is coördinated with the harness motion or shedding mechanism of the loom so that the first pick of fresh weft is laid in the shed which was open at the time the center fork detected weft absence.

This improved pick matcher is particularly designed for employment with automatic weft-replenishing looms, like that of the aforesaid Northrop Patent No. 529,940 in which the replenishing mechanism acts to substitute a fresh bobbin or other weft-carrier for the spent weft-carrier in the working shuttle. In such looms it is important that the loom should automatically stop in case there is an entire failure of weft, such as occurs, for example, in case the magazine for the supply weft-carriers should be wholly exhausted. Also, the Northrop loom is equipped with mechanism which suspends the action of the replenishing mechanism in case the shuttle is not in correct register with the weft supply when replenishment should occur (as set forth, for example, in the United States Letters Patent of James H. Northrop, No. 529,943, November 27, 1894) and it is important that this mechanism should be retained and that its presence shall not result in putting the replenishing out of time with the shedding mechanism. Also, the Northrop loom employs an automatically threading shuttle (one form of which is shown in United States Letters Patent of William F. Draper, No. 834,607, Oct. 30, 1906) and should the thread of the freshly inserted weft-carrier break on the first traverse of the replenished shuttle across the loom, or should the shuttle fail to thread, it is important that there should be no disturbance of synchronism between the replenishing and the shedding. In accordance with the present improvements provision is made for stopping the loom on any of these contingencies, or in the event of any occurrence which might have the effect of disturbing the synchronism between the replenishing action and the shedding.

In the accompanying drawings there is illustrated one embodiment of the present improvements in connection with an automatic weft-replenishing loom of the Northrop type in which there is a magazine for spare weft-carriers at one side only of the loom and in which there are three harnesses which progress regularly and without any abnormal action by reason of the presence of the pick-matching mechanism, and in which the picking of the shuttle back and forth continues without any abnormality due to the pick-matching mechanism. Such shedding and weft-supplying mechanisms are assumed for convenience in description and illustration of the improvements. The improvements in many aspects are applicable to other forms of weft-replenishing mechanism, and are also applicable to any loom having an odd number of harnesses which progress regularly when the loom is running.

Figure 2:
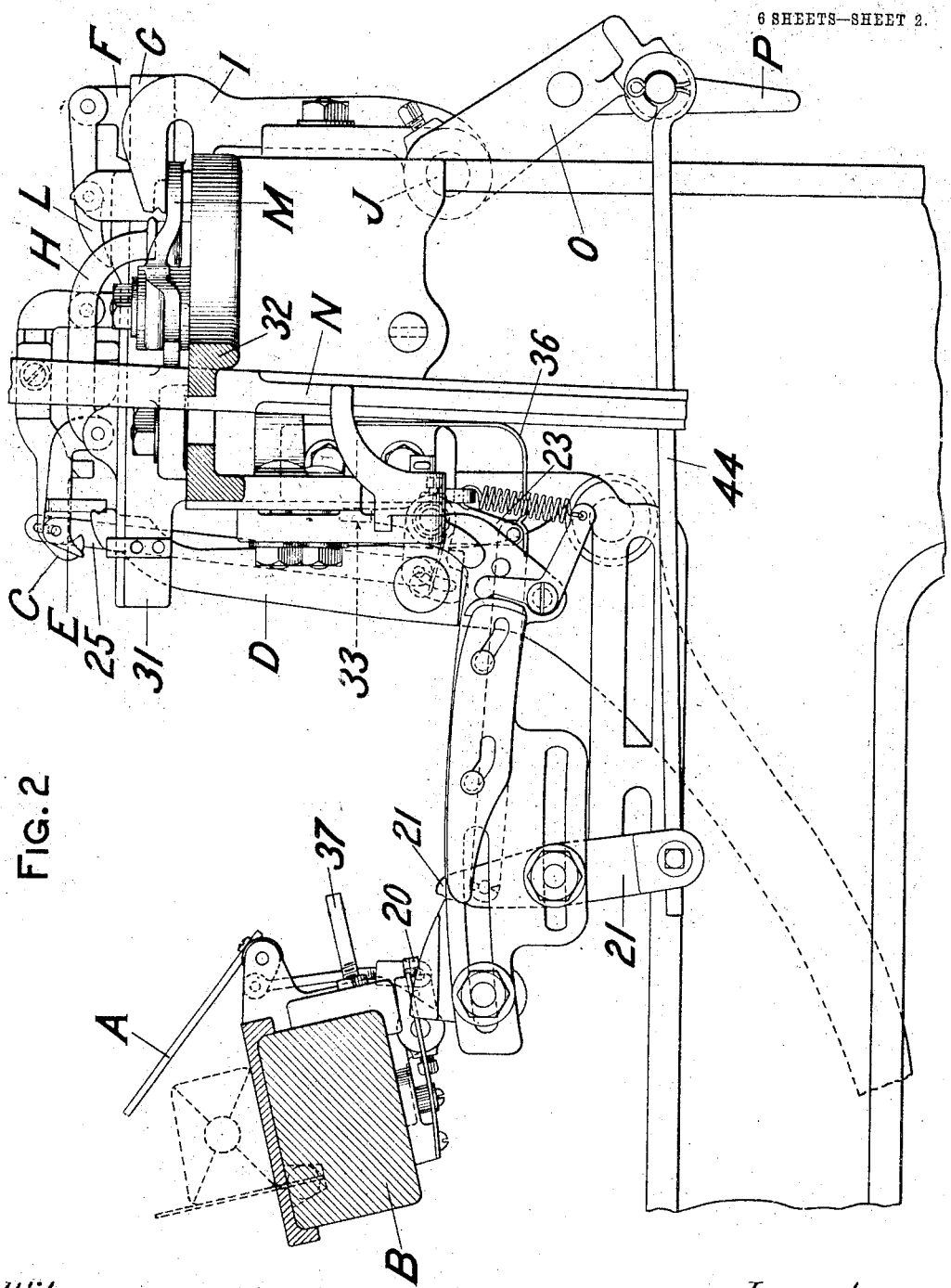

In the drawings—Figure 1 is a plan view of so much of an automatic weft-replenishing loom as is necessary for the elucidation of the present improvements. Fig. 2 is a side view, partly in section, of sufficient parts of a loom for an understanding of the improvements, this being a view of the "setting on" side of the loom, the weft supply being at the opposite side of the loom. Fig. 3 is a vertical cross-section of the breastbeam of the loom illustrating the differential delaying mechanism in side elevation, this mechanism being shown in its normal stationary idle position. Fig. 4 is a detail view of the cam which actuates the double-acting weft-hammer. Fig. 5 is a side view of the differential delaying mechanism partly in section illustrating the position of the parts just following the detection of weft absence when the shuttle is traveling toward the supply side of the loom. Fig. 6 is a side view of the differential delaying mechanism partly in section illustrating the position of the parts which they occupy when the weft-replenishment follows the detection of weft absence occurring when the shuttle is traveling toward the supply side of the loom. Fig. 7 is a side view, partly in section, of the differential delaying mechanism illustrating the position of the parts following replenishment and showing the parts in position to stop the loom in case a thread is not laid following the attempt of the differential mechanism to bring about a fresh supply of weft. Figs. 8, 9, 10 and 11 are side views of the differential delaying mechanism (in whole or in part) partly in section illustrating successive positions following the detection of weft absence when the shuttle is traveling away from the supply side of the loom. Fig. 12 is a horizontal section through the differential delaying mechanism in the regular plane indicated by the line 12—12 in Fig. 3. Fig. 13 is a vertical cross-section of the differential delaying mechanism in the plane indicated by the line 13—13 of Fig. 12. Fig. 14 is a vertical cross-section of the differential delaying mechanism in the plane indicated by the line 14—14 of Fig. 12. Fig. 15 is a side view of a part of the differential delaying mechanism, partly in section, illustrating the position of the parts when the weft supply is put into action following the detection of weft absence occurring when the shuttle is traveling away from the supply side of the loom. Fig. 16 illustrates the final restoration of certain of the principal features of the differential delaying mechanism to their initial idle position.

A is a center fork (Figs. 1 and 2) of known type which is carried by the lay B at its middle so as to work among the warp threads at their middle. The illustrated weft fork and its adjuncts (except so far as modified in accordance with the present improvements as will be hereinafter set forth) are similar to the center fork and its adjuncts set forth in application for Letters Patent of Great Britain of The British Northrop Loom Company, Limited, Number 6, dated January 1, 1909. Like in that patent, the center fork acts to detect weft absence during the first portion of the forward movement of the lay, and hence just after the shuttle has passed it during its flight through the shed in either direction.

In case the center fork detects weft absence the dagger 20 (Figs. 1 and 2) controlled thereby encounters the upper end of a centrally pivoted lever 21, thereby carrying said upper end forward and hence swinging said lever on its pivot. This lever is connected by a link 22 (Fig. 1) with a crank arm 23 (Fig. 2) on a rocking starting shaft 24, and the forward swing of the upper end of the lever 21 thus rocks said shaft. This shaft extends horizontally and beneath the inner portion of the differential delaying mechanism and at its inner end this rock shaft has a crank arm (Figs. 3 and 9) to which is pivoted the lower end of a vertically extending link 25. The rocking of the starting shaft 24 effects the pulling down of a hook C and a dog E into the path of the upper end of a vibrating double-acting weft-hammer D. The extreme rear and forward positions of the weft-hammer are indicated in Fig. 3. The differential action of the differential delaying mechanism depends upon whether or not the weft hammer first engages the hook C or the dog E, and this is determined according to the direction in which the shuttle is traveling when the detection of weft absence occurs. The weft hammer as usual is actuated by a cam on the cam shaft of the loom so that its complete back and forth reciprocation occurs once for each two picks of the loom. Hence, it will occupy its forward position during the pick of the shuttle in one direction and its rearward position during the pick of the shuttle in the opposite direction.

The present differential delaying mechanism is so organized that when the weft fails with the shuttle traveling toward the supply side of the loom, the weft-hammer will be forward (as shown in full lines in Fig. 3) when the hook C and the dog E descend and, hence, the hook C will be caught by the weft-hammer as it subsequently moves back, as is indicated in Fig. 5. On the other hand, should the weft fail when the shuttle is traveling away from the supply side of the loom, the weft-hammer will then occupy a rearward position (as indicated in dotted lines in Fig. 3) so that, when the hook C and dog E descend, the dog E will be caught by the weft-hammer when its next moves forward, as indicated in Fig. 8. On these two respective contingencies the differential delaying mechanism will act differently. In both cases there follows an intervening delay between detection and replenishment and the delay is different in the two cases and is so related to the shedding that the same shed will be open to receive the fresh weft which was open when weft absence was detected by the center fork.

The differential delaying mechanism can be most readily explained and understood by treating separately those instrumentalities which are brought into action under the two contingencies mentioned. Before doing so, however, a few constructional details will be explained.

The dog E is pivoted at 29 (see Fig. 10) to an arm 28 which in turn is pivoted at 30 to a main slide G which is mounted to slide horizontally back and forth in a fixed guide-stand 31 secured to the breast-beam 32 of the loom, as best shown in Figs. 12, 13 and 14. The main slide G is maintained in its normal rearward position by a spring 40, as shown in Fig. 5. Whenever the main slide is moved forward this spring restores it to its normal rearward position when free to do so. A shoulder 49 on the main slide G encounters the fixed guide-stand 31 (Fig. 5) and holds the main slide in its normal rearward position.

The main slide G carries a swinging coupler H which is pivoted at 30 to the main slide and is adapted to swing up and down. Normally, this dagger occupies an elevated position, as shown in Fig. 3, so that it is above and out of coöperation with a bunter I. Hence, the reciprocation of such dagger together with the main slide has no effect on the bunter I. This bunter is fast to the change shaft J (Figs. 1 and 2) of the weft replenishing mechanism. This change shaft is that commonly employed in the Northrop loom. When it is rocked it brings about the insertion of a fresh weft-carrier in the working shuttle and the concurrent ejection of the spent weft-carrier. This weft replenishing mechanism is now so well known that no illustration or description are considered necessary. The change shaft J itself is a sufficient conventional representation of this weft-replenishing mechanism. Such mechanism is shown, for example, in the Northrop Patent No. 529,940 heretofore mentioned. The change shaft with its bunter I, constitutes the controlling means for the replenishing instrumentalities, and its movement is preliminary to the action of such instrumentalities. In case the coupler H should occupy a lower position, as shown in Fig. 6 or in Fig. 15, when the main slide G is moved forward, then it encounters the bunter I, the change shaft J is rocked, and the weft-supply mechanism is put into action.

The hook C is pivoted at 26 (Figs. 3 and 8) to an auxiliary or hook slide F which slides back and forth upon the main slide G, being suitably guided thereby, as indicated in Figs. 13 and 14. This auxiliary or hook slide F is capable of sliding either with or independently of the main slide. Except as hereinafter specified, it moves back and forth together with the main slide G, being maintained in position relatively to the main slide both by gravity and by the friction spring 41, shown in Figs. 6, 12 and 13. In addition there is a third or cam slide K which can move independently of both of the other slides or with either. This cam slide is mounted and guided within the main slide G, (see Figs. 12 and 13) so as to slide back and forth. Commonly, and except as hereinafter stated, this cam slide moves back and forth with the main slide, being maintained in proper position thereon both by gravity and the friction spring 42 shown in Fig. 12. The fundamental purpose of this cam slide is to determine when the coupler H shall move down into the plane of the bunter I, such down movement being followed by the action of the weft-supplying mechanism.

The hook C has a slot-and-pin connection 39 (Fig. 3) with the link 25 and said hook is normally held uplifted by the spring connection 38 (Fig. 9) between the lower end of said link and the starting shaft 24. The hook C has a laterally extending horizontal projection 27 which extends beneath the arm 28 carrying the dog E, as shown in Figs. 7 and 16. Hence the dog E is normally uplifted and when the hook C descends it also descends by gravity.

The differential action, as already stated, is followed by delays of different duration between detection and replenishment, depending upon the direction in which the shuttle is traveling when weft failure occurs. This involves a number of intervening beats of the lay when the shedding mechanism continues to act and when the shuttle is traversing back and forth carrying no thread so that the weft fork at each beat detects weft absence. The differential delaying mechanism is so constructed and organized, as will hereinafter appear, that the successive detections either have no effect at all or else are instrumental in bringing about the weft-supplying action. As the lay moves forward after detection, the dagger 20 first encounters the upper end of the lever 21, thereby rocking shaft 24, pulling down link 25, so that both hook C and dog E descend by gravity into the plane of the path of the weft-hammer. However, during the succeeding forward movement of the lay, the dagger 20 soon passes forward beyond the lever 21, and during the greater portion of the remainder of the forward movement of the lay the starting shaft 24 is held in position with the link 25 pulled down by means of the double-acting friction spring 36, shown in Fig. 2. This same spring also holds the starting shaft in its normal position with the link 25 up. When, however, the lay approaches front center a forwardly projecting finger 37, (Figs. 1 and 2) on the lay encounters an upwardly extending arm 33 (see Figs. 1 and 9) carried by the starting shaft 24, thereby rocking said shaft back to its normal position and hence elevating the link 25 through spring connection 38. This rocking of the starting shaft first in one direction and then the other occurs during every forward beat of the lay when the center fork detects the absence of weft.

Now, assuming the case that the weft fails while the shuttle is traveling toward the supply side of the loom before the eye of the shuttle reaches the path of the center fork: In such case the center fork will detect weft absence, the starting shaft 24 will be rocked, and the hook C and dog E will be lowered at a time when the weft-hammer is at or near its forward position, as shown in full lines in Fig. 3. Hence, the hook C will be caught by the backwardly moving weft-hammer as shown in Fig. 5. The weft-hammer thus catches the hook C before the lay reaches front center. Hence, when the starting shaft 24 is restored to its normal position by the lay pin 37 encountering the arm 33, the hook C has already been engaged by the weft-hammer and can not be disengaged therefrom since the spring connection 38 between the starting shaft 24 and link 25 then yields. During this backward stroke of the weft-hammer while engaging the hook C, the hook slide F is drawn back independently of the then stationary main slide G. Pivoted to the hook slide F is a finger 34 (Figs. 3 and 5) which extends down with its lower end in front of the cam slide K, so that the cam slide K slides back together with the hook slide F a sufficient distance to enable the coupler H to drop down into the plane of the bunter I. As shown in Figs. 8 and 16, the coupler H is normally held in its uplifted position by means of a depending toe 35 resting on the high level $a$ of the cam slide K. When thus upheld the coupler H is above and out of the plane of the coöperating end of the bunter I. When, however, the cam slide K is moved back by the backward movement of the finger 34 during the rearward movement of the weft-hammer while holding onto the hook C, it is moved far enough at one stroke to bring its coöperating lower level $b$ beneath the toe 35 of coupler H; and, accordingly, said coupler drops by gravity until its toe 35 rests on the level $b$ of the cam slide, as is shown in Fig. 5. This lowers the coupler H so that its forward end is then in the same horizontal plane as the bunter I. If, therefore, the main slide G to which the coupler H is pivoted should then be moved forward, the coupler H would encounter the bunter I, and the change shaft J would be rocked and fresh weft would be supplied to the loom. This result is effected because at the next forward movement of the weft-hammer it encounters the dog E (as shown in Fig. 6) thereby forcing said dog, together with the main slide G and the coupler H forward, during which movement said coupler encounters the bunter I and the change shaft is rocked.

Between the rearward movement of the weft-hammer when it pulls the hook C together with the cam slide K back with it, and the next forward movement of the weft-hammer when it encounters the dog E, there is another detection of weft absence by the center fork which is followed by a rocking of the starting shaft 24, thereby insuring the dog E being in its lower position when the weft-hammer moves forward. Consequently, the weft-hammer is sure to encounter the dog E and thereby effect the action of the weft-supplying mechanism.

It will be seen that there is a delay between detection of weft absence and the supply of weft (in the case under consideration) which is equal to something more than a complete back and forth stroke of the weft-hammer and hence somewhat exceeding in duration the period required for two complete beats of the lay. This delay is sufficient (in the case of a three harness loom wherein the shedding progresses uninterruptedly) to open for the reception of fresh weft the same shed which was open when the detection of weft absence occurred. Hence, the pick will be matched. In further explanation of this it will be noted that the assumption is that the thread ran out just before the center fork was reached when the shuttle was traveling toward the supply side of the loom. During the following completion of the forward beat of the lay, the weft-hammer catches the hook on its backward movement. While the weft-hammer is moving back and then forward again, the empty shuttle makes two excursions across the lay; first away from the supply side of the loom, and secondly back again to the supply side of the loom. Hence, the shuttle at the completion of this third pick is at the supply side of the loom. The timing of the differential delaying mechanism is such that fresh weft is then supplied to the shuttle. Calling the pick at which detection of weft absence was made as the first pick, the freshly supplied shuttle will pass across the lay at the fourth pick. In a three harness loom in which the harnesses run regularly, the same shed will be open at the first and at the fourth pick. Hence the first pick of fresh weft will be laid in the same shed as the partial pick extending less than half way across the cloth. Hence, under this stated case, the shed will have a partial pick of the spent weft and a full pick of the fresh weft, this being permissible in the class of fabrics for which this mechanism is adapted. A fresh strand of weft being thus laid in the shed, the center fork will (on the next forward beat of the lay) not swing far enough to effect the differential delaying mechanism, and all parts of the differential delaying mechanism will be restored to their normal positions.

As the weft-hammer moves back following the supply of weft, the main slide will move back with it to its normal position under the stress of the spring 40 (Fig. 5). When in its back and forth movements the weft-hammer becomes free from contact with the hook C and the dog E, the spring connection 38 between the rock shaft 24 and the link 25 lifts the hook C and hence the dog E (through the lifting projection 27 on hook C) to their normal uplifted positions out of the path of the weft-hammer. Finally, on the next following forward stroke of the weft-hammer it encounters both the cam slide K and the hook slide F and forces them forward to their normal stationary positions.

It is desirable that precaution should be taken to prevent the dog E being prematurely elevated out of reach of the weft-hammer. As just stated, the first action of the weft-hammer (in the case under consideration) is to engage the hook C as it is moving backward and to carry it to the position shown in Fig. 5. The weft-hammer then moves forward and loses its hold on the hook C which is thereupon moved upwardly by the spring 38, and thereafter said hook is under the lifting force of the said spring. This upward movement may be sufficient to lift the hook out of the path of the weft-hammer but it must not be effective to move the dog E out of the path of the weft-hammer. To prevent this happening, the pivoted arm 28 which carries the dog E has a downwardly projecting tail 50 which coöperates with a high level $h$ and two low levels $g$ and $i$ of the cam slide K. When the cam slide K occupies its forward position, as shown in Fig. 3, this tail 50 is in register with the low level $g$ and is below the high level $h$. When, however, the dog E and its arm 28 descend, as shown in Fig. 5, the tail 50 is lifted out of the low place $g$ so as to leave the cam slide K free to move backward. The backward movement of the cam slide brings the high level $h$ beneath the tail 50 (Fig. 5) and hence prevents the upward swinging of the dog E so that it is maintained in the path of the weft-hammer and cannot be lifted by the spring 38 acting upon the link 25 and hence upon the hook C. Incidentally it may here be stated that the downward swing of the dog E is limited by a strut 48 (Figs. 7 and 10) on the arm 28 encountering the top of the cam slide G.

The dog E cannot be lifted to its normal elevated position until the tail 50 is freed from the high level $h$ of the cam slide. This freeing is effected by a forward movement of the tail 50 relatively to the cam slide so that said tail 50 is brought into register with the low level $i$ of the cam slide; this being indicated in Fig. 6. When this is done, then the dog E is free to be swung up under the influence of the spring 38 as soon as released from the pressure of the wef-hammer. This relative movement between the cam slide K and the tail 50 is due to the fact that the cam slide K is held from moving forwardly with the main slide G during the weft-supply controlling forward movement of the main slide G and its coupler H. To this end, the fixed guide-stand 31 has pivoted to it a gravity pawl L. This pawl rests at its free end upon a guard 43 (Fig. 5) carried by the main slide G and which overhangs the cam slide K. When now the main slide G is moved forward by the weft-hammer acting on the dog E (as shown in Fig. 6) the guard 43 passes forward beneath the pawl L, the point of which thereupon falls in front of a ratchet tooth $e$ of the cam slide K, thereby preventing any further forward movement of the cam slide with the main slide. Hence, during the completion of the forward movement of the main slide, the cam slide remains stationary and hence the tail 50 is carried forward over the low level $i$ of the cam slide, as shown in Fig. 6, thus leaving the dog E free to be lifted to its normal position. The following rear movement of the main slide G under the influence of its spring 40 causes the guard 43 to lift the pawl L free of the tooth $e$ so that the cam slide K is then free to be moved forward to its normal position when encountered by the weft-hammer on its next forward stroke. Thus, all the parts of the differential delaying mechanism are restored to their normal positions.

So far, there has only been considered the case of the detection of weft absence by the center fork when the shuttle is traveling toward the supply side of the loom. Assume, now, that the shuttle is traveling away from the supply side and lays a partial pick in the shed, but not sufficient to reach to the center fork. The center fork then detects weft absence and the starting shaft 24 is then rocked and the hook C and the dog E are lowered. In this case the hook C together with its slide F and finger 34 has no function and it is only necessary to consider the dog E and its coöperating instrumentalities. As this detection takes place at a half revolution of the cam shaft from the position thereof when weft absence is detected at the opposite flight of the shuttle, the weft-hammer will be back (as indicated in dotted lines in Fig. 3) when the dog E descends into coöperating position. Accordingly, the dog E is then in position to be encountered by the weft-hammer as the weft-hammer then moves forward. The weft-hammer accordingly engages the dog E and carries forward with it the main slide G and the coupler H, but no effect is had on the weft supply because the coupler H is then elevated and passes idly above the bunter I. During the first part of this relative movement of the main slide G, the cam slide K moves concurrently with the main slide. This forward movement of the main slide, however, carries the guard 43 beneath the pawl L, whereupon the pawl catches in front of the rearward ratchet tooth $c$ of the cam slide (Fig. 8) and holds the cam slide stationary during the completion of the forward movement of the main slide.

Fig. 8 shows the position of the parts at the completion of the first forward stroke of the weft-hammer. As here shown the cam slide K has been moved relatively to the main slide sufficiently to lock the dog E in its lowermost position through the engagement of its high level $h$ with the tail 50; but the relative movement has not been sufficient to free the toe 35 of the coupler H from the high level $a$ so that said coupler still remains uplifted. During the next backward stroke of the weft-hammer, the main slide G and cam slide K move back under the stress of the spring 40 (Fig. 5) until the main slide reaches its normal position. Fig. 9 illustrates the position of the parts when the weft-hammer is then all the way back. As here shown, the dog E is locked down by the engagement of its tail 50 with the high level $h$, and the toe 35 of the coupler H is still resting on the high level $a$. On its next or second forward movement, the weft-hammer again encounters the dog E carrying forward the main slide G and the coupler H which being still uplifted passes idly over the bunter I. This time, also, the forward movement of the main slide withdraws the guard 43 from beneath the pawl L which accordingly drops down and again engages the notched cam slide K, but this time it engages the middle ratchet tooth $d$ thereof, as shown in Fig. 10. Hence, during the completion of the forward movement of the main slide G, the cam slide K is held stationary so that the toe 35 of the coupler H is brought into register with the intermediate level $b$ of the cam slide. The position of the parts at the completion of this second forward stroke of the weft-hammer is shown in Fig. 10. It will be noted that the dog E is still locked in its lower position by its tail 50 resting on the high level $h$ of the cam slide.

During the second backward stroke of the weft-hammer the main slide G and the cam slide K are carried back by the spring 40, and Fig. 11 shows the position of the parts when the weft-hammer is all the way back the second time. During this backward movement the coupler H drops until its toe 35 rests on the intermediate level $b$, in which position the dagger is in the plane of the bunter I and back of it. The weft-hammer then moves forward for the third time and again encounters the dog E which is locked down by the high level $h$. Accordingly, the slide G and coupler H are carried forward, the coupler encounters the bunter I, the weft-replenishing mechanism is actuated, and a fresh supply of weft is furnished to the working shuttle. During this forward movement the cam slide K goes forward also until the guard 43 passes from beneath the pawl L, which thereupon engages the third and foremost tooth $e$ of the cam slide K, thus holding the cam slide so that during the final portion of the movement of the main slide G the tail 50 passes into register with the low level $i$, (Fig. 15) thus leaving the dog E free to be restored to its uplifted position out of reach of the weft-hammer. All parts are then restored to their normal positions following weft-replenishment just as in the first mentioned case. It will be noted that the replenishment in this case requires three forward movements of the weft-hammer. The result is a prolonged delay during which there are five back and forth picks of the empty shuttle. Calling pick 1 that occurring when the center fork detected weft absence due to a partial pick being laid not reaching to the center fork, picks 2, 3, 4, 5 and 6 are idle with the shuttle empty. At the close of pick 6 the shuttle is at the supply side of the loom and then gets a fresh supply of weft. Accordingly, pick 7 is with the fresh weft. In a three harness loom with the harnesses running regularly and without interruption or interference, the same shed will be open at pick 7 as at pick 1, and hence the fresh strand of weft will be laid in the same shed as that having the partial pick of the spent weft not reaching to the center fork.

It will be noted that the differential action is due to the fact that when the hook C is engaged by the weft-hammer, the cam slide is at one stroke moved to the position where it allows the descent of the coupler H so that the replenishment occurs on the next forward stroke of the weft-hammer. In the other instance, however, the hook C has no function and the slide is moved partially step by step through the action of the pawl L upon the ratchet teeth of the cam slot, so that ineffective forward strokes of the weft-hammer occur before the coupler H is brought into coöperative relation with the bunter I. The weft-fork, the differential delaying mechanism, and their connecting mechanisms together with the weft-hammer constitute pick-matching devices operating on failure of weft in either direction of the pick with selective timing varied to correspond with the direction of the pick in which failure occurs and causing the first pick of fresh weft to be introduced into the proper shed to receive it. The timing is different depending on the direction of the pick when failure occurs, and the selection of one timing or the other depends upon the position of the weft-hammer, when the starting shaft 24, is rocked. It is obvious that this same mechanism can be utilized with any odd number of harnesses by regulating the number of strokes necessary to bring the cam slide into such position that its level b will coöperate with the toe 35 of the coupler H. The pawl L and its coöperating teeth can be so arranged as to require enough additional strokes to bring the cam slide into position, both after the finger 34 has initially acted, and when the dog E, first acts.

In addition to the two cases already considered, two other cases may arise with the center fork. The weft may fail after the shuttle has passed the center fork on its way to the supply side of the loom; or it may fail after the shuttle has passed the center fork when traveling away from the supply side of the loom. In both of these cases there will be a partial pick extending more than half way across the cloth, and in each case the fresh strand of weft will be laid not in that shed but in the next following shed. Accordingly, there will be instances in which there is a shed partially empty, but as such shed will be more than half full, the matching of the pick is sufficient in the making of some fabrics.

Provision is made for the stoppage of the loom under such contingencies as would disturb the synchronism between the shedding and the weft-replenishing mechanisms, or in case the magazine has no spare weft.

The restoration of the differential delaying mechanism to its normal position involves the moving of the cam-slide K forward to its normal position by the direct contact therewith of the weft-hammer on its next forward movement following replenishment, and also the similar forward movement of the hook slide F in case the hook C has been operated. This independent forward movement of the cam slide K cannot take place, if the dog E remains down in the path of the weft-hammer as it will in case the shuttle gets no fresh supply of thread, because, the shuttle will then be moving empty away from the supply side of the loom and the center fork will detect weft absence and bring the dog E down into the path of the forwardly moving weft-hammer. This is taken advantage of to stop the loom, no matter to what cause the absence of weft may then be due,—whether to final exhaustion of weft in the magazine, to the action of the shuttle feeler of the Northrop Patent No. 529,943 (above mentioned) or through breakage of thread. As shown in Figs. 6 and 15, the action which takes place when the bunter I is swung to rock the change shaft J is to bring a low level f of the cam slide K beneath the toe 35 of the coupler H. Consequently, when the slides G and K can move back under the action of spring 40, the toe 35 drops onto this low level, (Fig. 7), thus still further depressing the coupler H so that it is then back and in the plane of a centrally pivoted knock-off lever M (Figs. 1 and 12) which coöperates as usual with the ordinary shipper lever N to stop the loom. Hence, if there is no thread laid following the replenishing action, at its next forward movement the weft-hammer will again engage the dog E, thus moving the main slide G and the coupler H forward, whereupon said coupler will encounter the knock-off lever M, thus releasing the shipper N, and stopping the loom. When the coupler H is in its lowest position, shown in Fig. 7, it is below the plane of the part of the bunter I which it encounters when in the position shown in Fig. 6; and, consequently, when the coupler encounters the knock-off lever M it does not encounter the bunter I so that there is no actuation of the change shaft or of the change mechanism when the loom is stopped.

The weft-hammer has been referred to several times as a double-acting weft-hammer because it performs work on both its forward and backward movements, thus differing from common weft-hammers. During its backward movement it may have to pull on the hook C and thus pull the slide F and the cam slide K backward. On the other hand during its forward movement it has to perform its main duties. Moreover, its movements must be accurately timed with respect to the center fork action and the shedding. Fig. 4 shows a suitable cam 45 on the cam shaft 46 of the loom and the weft-hammer is maintained in contact with this cam by the illustrated spring which is powerful enough to cause the weft hammer to pull the slides F and K back. By reason of the pivoting of the hook C, and the dog E, and the beveling of the top of the weft-hammer, they can swing out of the way of the weft-hammer when required. As several idle picks take place it is important that the take-up should not advance the cloth. To this end the lower end of the lever 21 (see Fig. 2) is connected by a link 44 with an arm O which is loosely hung on the change shaft J. This arm has a striker P which hits and lifts the take-up pawl so that the take-up does not act to feed the cloth.

It has heretofore been stated that the tail 50 of the arm 28 of the dog E is a precautionary device to absolutely prevent any disconnection during the period between detection and replenishment. It may in some cases be dispensed with. In such event a desirable result is achieved. It occasionally happens with center fork looms that, through slackness in the threads, the center fork may perform its detecting movement while the weft is intact. In such event there will be an unnecessary change of weft. When the tail 50 is present a change will take place under such a contingency and the proper matching of the pick will not be disturbed. If, however, the tail 50 is omitted then the change will not take place because on the pick following the detective action of the center fork a thread will be present and the hook C and dog E will be lifted by the spring 38 with the result that the weft-hammer will encounter the slides F and K and restore them to their normal idle positions. Hence the weaving will continue without unnecessary changes of weft.

I claim:

1. An automatic weft-replenishing pick-matching loom provided with a weft-supplying mechanism at one side only and three harness and picking mechanisms which continue their normal operation during weft-absence detection and weft-replenishment, said loom having, in combination, a change-shaft governing the action of the weft-supplying mechanism; a single weft-absence detector consisting of a center-fork, which detects weft-absence following the pick of the shuttle in both directions, a single double-acting weft-hammer which makes one complete reciprocation to two picks of the shuttle; a normally idle coupler adapted to coöperate with the change shaft; and a differential delaying mechanism between said weft-hammer and coupler, said differential mechanism comprising (a) a main slide carrying the coupler, (b) a dog carried by the main slide and adapted to be engaged by the weft-hammer when moving forward, (c) a cam slide with ratchet teeth which normally holds the coupler idle, but when moved back a definite distance permits said coupler to operatively engage the change-shaft, (d) a pawl which coöperates with said cam slide to hold it against full forward movement, (e) a pawl guard carried by the main slide which normally holds said pawl idle, (f) a hook slide, (g) a hook on said slide which is adapted to be engaged by the weft-hammer on its back stroke (h) a finger on said hook slide which coöperates with said cam-slide to move it back at once into position to permit the coupler to engage the change-shaft, and (i) mechanism governed by the center-fork and controlling the engagement of said dog and hook with the weft-hammer.

2. An automatic weft-replenishing pick-matching loom provided with a weft-supplying mechanism at one side only and three harness and picking mechanisms which continue their normal operation during weft-absence detection and weft-replenishment, said loom having, in combination, a change-shaft governing the action of the weft-supplying mechanism, a single weft-absence detector consisting of a center-fork, which detects weft-absence following the pick of the shuttle in both directions; a single double-acting weft-hammer which makes one complete reciprocation to two picks of the shuttle; a normally idle coupler adapted to coöperate with the change shaft, and a differential delaying mechanism between said weft-hammer and coupler, said differential mechanism comprising a cam with ratchet teeth which normally holds the coupler idle, but when moved a definite distance permits said coupler to operatively engage the change-shaft, and two sets of instrumentalities governed by the center-fork and actuated by the weft-hammer, one of said sets acting to move the cam at once to the requisite distance and the other set acting to move said cam by several successive steps the same distance.

3. An automatic weft-replenishing pick-matching loom, provided with a weft-supplying mechanism at one side only and shedding and picking mechanisms which continue their normal operation during weft-absence detection and weft-replenishment, said loom having, in combination, a change-shaft governing the action of the weft-supplying mechanism; a single weft-absence detector consisting of a center-fork, which detects weft-absence following the pick of the shuttle in both directions; a single double acting weft-hammer which makes one complete reciprocation to two picks of the shuttle; a normally idle coupler adapted to coöperate with the change shaft; and a differential delaying mechanism between said weft-hammer and coupler, said differential mechanism comprising a cam slide with ratchet teeth which normally holds the coupler idle, but when moved a definite distance permits said coupler to operatively engage the change-shaft, and two sets of instrumentalities governed by the center-fork and actuated by the weft-hammer, one of said sets acting to move the cam the requisite distance in a given interval, and the other set acting to move said cam that distance in a greater interval.

4. An automatic weft-replenishing pick-matching loom, provided with a weft-supplying mechanism at one side only and shedding and picking mechanisms which continue their normal operations during weft-absence detection and the action of the controlling means for weft-replenishment, said loom having in combination, controlling means governing the action of the weft-supplying mechanism; a single weft-absence detector consisting of a center-fork, which detects weft absence following the pick of the shuttle in both directions; a single double acting weft-hammer which makes one complete reciprocation to two picks of the shuttle; a normally idle coupler adapted to coöperate with said controlling means and a differential delaying mechanism between said weft-hammer and coupler said differential mechanism comprising a cam which normally holds the coupler idle, but when moved a definite distance permits said coupler to operatively engage the controlling means and two sets of instrumentalities governed by the center-fork and actuated by the weft-hammer, one of said sets acting to move the cam the requisite distance in a given interval, and the other set acting to move said cam that distance in a greater interval.

5. An automatic weft-replenishing pick-matching loom, provided with a weft-supplying mechanism at one side only and shedding and picking mechanisms which continue their normal operations during weft-absence detection and the action of the controlling means for weft-replenishment, said loom having, in combination, controlling means governing the action of the weft-supplying mechanism; weft-absence detecting mechanism which detects weft-absence following the pick of the shuttle in both directions; a single double acting weft-hammer which makes one complete reciprocation to two picks of the shuttle; a normally idle coupler adapted to coöperate with said controlling means and a differential delaying mechanism between said weft-hammer and coupler, said differential mechanism comprising a cam which normally holds the coupler idle, but when moved a definite distance permits said coupler to operatively engage the controlling means, and two sets of instrumentalities governed by its detecting mechanism, one of said sets acting to move the cam the requisite distance in a given interval, and the other set acting to move said cam that distance in a greater interval.

6. An automatic weft-replenishing pick-matching loom wherein replenishment is effected by supplying fresh weft to the shuttle, said loom having, in combination, a single weft-absence detector consisting of a center-fork; a controlling or change shaft for the replenishing instrumentalities; a main slide; a weft-hammer; means controlled by said center-fork to connect said hammer and slide; a knock-off lever adapted by its movement to stop the loom; a single normally idle coupler adapted in one position to couple the main slide to the change shaft and in a different position to couple the main slide with the knock-off lever and not with the change shaft; and a cam governing the coupler and controlled in its movement by the center-fork.

7. An automatic weft-replenishing pick-matching loom wherein replenishment is effected by supplying fresh weft to the shuttle, said loom having, in combination, a weft-absence detector; a controlling or change shaft for the replenishing instrumentalities; a main slide; a weft-hammer; means controlled by said detector to connect said hammer and slide; a knock-off lever adapted by its movement to stop the loom; a single normally idle coupler adapted in one position to couple the main slide to the change shaft, and in a different position to couple the main slide with the knock-off lever and not with the change shaft; and a cam governing the coupler and controlled in its movement by the detector.

8. An automatic weft-replenishing pick-matching loom having, in combination, a weft-absence detector; controlling means for the replenishing instrumentalities; a main slide; a weft-hammer; means controlled by said detector to connect said hammer and slide; a knock-off lever adapted by its movement to stop the loom; a single normally idle coupler adapted in one position to couple the main slide to the change shaft, and in a different position to couple the main slide with the knock-off lever and not with the change shaft; and a cam governing the coupler and controlled in its movement by the detector.

9. An automatic weft-replenishing pick-matching loom wherein replenishment is effected by supplying fresh weft to the shuttle, said loom having, in combination, a weft-absence detector; controlling means for the replenishing instrumentalities; pick-matching devices operating on failure of weft in either direction of the pick with selective timing varied to correspond with the direction of the pick in which failure occurs and causing the first pick of fresh weft to be introduced into the proper shed to receive it; and means to stop the loom in case the shuttle fails to lay thread after the action of the controlling means for the replenishing instrumentalities, said means being governed by the weft-absence detector.

10. An automatic weft-replenishing pick-matching loom wherein replenishment is effected by supplying fresh weft to the shuttle, said loom having, in combination, a weft-absence detector; controlling means for the replenishing instrumentalities; pick-matching devices operating on failure of weft in either direction of the pick with selective timing varied to correspond with the direction of the pick in which failure occurs and causing the first pick of fresh weft to be introduced into the proper shed to receive it, and means to stop the loom in case the shuttle fails to lay thread after the action of the controlling means for the replenishing instrumentalities.

11. An automatic weft-replenishing pick-matching loom wherein replenishment is effected by supplying fresh weft to the shuttle, said loom having, in combination, weft-absence detecting mechanism operative for picks in both directions; controlling means for the replenishing instrumentalities; pick-matching devices operating on failure of weft in either direction of the pick with selective timing varied to correspond with the direction of the pick in which failure occurs and causing the first pick of fresh weft to be introduced into the proper shed to receive it; and means to stop the loom in case the shuttle fails to lay thread after the action of the controlling means for the replenishing instrumentalities.

12. An automatic weft-replenishing pick-matching loom having, in combination, a weft-absence detector; controlling means for the replenishing instrumentalities; pick-matching devices operating on failure of weft in either direction of the pick with selective timing varied to correspond with the direction of the pick in which failure occurs and causing the first pick of fresh weft to be introduced into the proper shed to receive it; and means to stop the loom in case the shuttle fails to lay thread after the action of the controlling means for the replenishing instrumentalities, said means being governed by the weft-absence detector.

13. An automatic weft-replenishing pick-matching loom having, in combination, a weft-absence detector; controlling means for the replenishing instrumentalities; pick-matching devices operating on failure of weft in either direction of the pick with selective timing varied to correspond with the direction of the pick in which failure occurs and causing the first pick of fresh weft to be introduced into the proper shed to receive it; and means to stop the loom in case no thread is laid after the action of the controlling means for the replenishing instrumentalities, said means being governed by the weft-absence detector.

14. An automatic weft-replenishing pick-matching loom having, in combination, weft-absence detecting mechanism operative for picks in both directions; controlling means for the replenishing instrumentalities; pick-matching devices operating on failure of weft in either direction of the pick with detective timing varied to correspond with the direction of the pick in which failure occurs and causing the first pick of fresh weft to be introduced into the shed to receive it; and means to stop the loom in case no thread is laid after the action of the controlling means for the replenishing instrumentalities, said means being governed by the weft-absence detecting mechanism.

15. An automatic weft-replenishing loom provided with picking and shedding mechanisms and with weft-supplying mechanism at one side only, said loom having, in combination, a single weft-absence detector, consisting of a center-fork; and differential delaying mechanism controlled by said detector which permits a different number of idle picks and of idle shed formations after detection of weft-absence and before weft-replenishment depending on the direction in which the shuttle was picked preceding the detection of weft-absence by the single detector.

16. An automatic weft-replenishing loom provided with picking and shedding mechanisms and with weft-supplying mechanism at one side only, said loom having, in combination, a single weft-absence detector operative for picks in both directions and differential delaying mechanism controlled by said detector which permits a different number of idle picks and of idle shed formations after detection of weft-absence and before weft-replenishment depending on the direction in which the shuttle was picked preceding the direction of weft-absence by the single detector.

17. An automatic weft-replenishing loom provided with picking, shedding and weft-supplying mechanisms, said loom having, in combination, a single weft-absence detector operative for picks in both directions; and differential delaying mechanism controlled by said detector which permits a different number of idle picks and of idle shed formations after detection of weft-absence and before weft replenishment' depending on the direction in which the shuttle was picked preceding the detection of weft-absence by the single detector.

18. An automatic weft-replenishing loom, having, in combination, controlling means for the replenishing instrumentalities; detecting mechanism operative for picks in both directions; operative connections between said detecting mechanism and said controlling means so that several successive detections of weft-absence are required to effect replenishment, and said successive detections varying in number depending on the direction of the failing pick; and means for restoring said operative connections to idle position, said means being dependent upon the weft-detector encountering shuttle thread, whereby weft-replenishment will not take place in case detection is due to slack weft provided that the slack is taken up at any pick prior to the complete action of the weft replenishing controlling means.

In witness whereof, I have hereunto signed my name in the presence of two subscribing witnesses.

PAUL DAY.

Witnesses:
EDWARD DANA OSGOOD,
ALBERT W. EDWARDS.